United States Patent
Deng et al.

(10) Patent No.: US 10,605,587 B2
(45) Date of Patent: Mar. 31, 2020

(54) METHOD AND APPARATUS FOR PROCESSING LASER POINT CLOUD DATA

(71) Applicant: BEIJING BAIDU NETCOM SCIENCE AND TECHNOLOGY CO., LTD., Beijing (CN)

(72) Inventors: Chengliang Deng, Beijing (CN); Yu Ma, Beijing (CN); Kaiwen Feng, Beijing (CN); Yibing Liang, Beijing (CN); Bocong Liu, Beijing (CN); Zhuo Chen, Beijing (CN)

(73) Assignee: BEIJING BAIDU NETCOM SCIENCE AND TECHNOLOGY CO., LTD., Beijing (CN)

( * ) Notice: Subject to any disclaimer, the term of this patent is extended or adjusted under 35 U.S.C. 154(b) by 535 days.

(21) Appl. No.: 15/411,911

(22) Filed: Jan. 20, 2017

(65) Prior Publication Data
US 2018/0073858 A1    Mar. 15, 2018

(30) Foreign Application Priority Data
Sep. 14, 2016  (CN) .......................... 2016 1 0825200

(51) Int. Cl.
| | |
|---|---|
| *G01B 11/00* | (2006.01) |
| *G01S 17/42* | (2006.01) |
| *G01S 7/486* | (2020.01) |
| *G01S 7/4912* | (2020.01) |
| *G01S 17/89* | (2020.01) |
| *G01S 1/00* | (2006.01) |

(Continued)

(52) U.S. Cl.
CPC ............ *G01B 11/002* (2013.01); *G01B 11/24* (2013.01); *G01S 1/00* (2013.01); *G01S 7/486* (2013.01); *G01S 7/4912* (2013.01); *G01S 17/42* (2013.01); *G01S 17/89* (2013.01); *G01S 17/93* (2013.01)

(58) Field of Classification Search
None
See application file for complete search history.

(56) References Cited

U.S. PATENT DOCUMENTS

| | | | | |
|---|---|---|---|---|
| 2010/0082995 A1* | 4/2010 | Dees | ......................... | G06F 1/14 713/178 |
| 2011/0026772 A1* | 2/2011 | Hagan | .................. | H04N 19/124 382/104 |
| 2012/0215939 A1* | 8/2012 | Lu | ........................... | H03M 7/30 709/247 |

FOREIGN PATENT DOCUMENTS

| | | |
|---|---|---|
| CN | 103945371 A | 7/2014 |
| CN | 105426121 A | 3/2016 |

* cited by examiner

*Primary Examiner* — Christopher Braniff
(74) *Attorney, Agent, or Firm* — Marshall, Gerstein & Borun LLP

(57) ABSTRACT

A method and an apparatus for processing laser point cloud data includes obtaining laser point data to be used by a data receiver comprising an acquisition time; determining a timestamp for representing the acquisition time, and splitting the timestamp into a base timestamp and an offset timestamp; and storing the base timestamp and compressed laser point cloud data. Laser point cloud data output by a laser radar is compressed and comprises only offset timestamps corresponding to respective laser points. The base timestamp and the offset timestamp may be added to obtain the required synchronization precision timestamp, and the data is synchronized. The processing speed of a CPU or GPU for the laser point cloud data is improved while the timestamp precision reaches the precision required by synchronization of the laser point cloud data, and storage space is saved.

12 Claims, 6 Drawing Sheets

(51) Int. Cl.
*G01B 11/24* (2006.01)
*G01S 17/93* (2020.01)
*G06T 17/00* (2006.01)
*G01S 17/88* (2006.01)
*G01S 7/48* (2006.01)

METHOD AND APPARATUS FOR PROCESSING LASER POINT CLOUD DATA

CROSS-REFERENCE TO RELATED APPLICATION

This application is related to and claims priority from Chinese application No. 201610825200.X, filed on Sep. 14, 2016, entitled "Method and Apparatus for Processing Laser Point Cloud Data", the entire disclosure of which is hereby incorporated by reference.

TECHNICAL FIELD

The present application relates to the field of computer technology, particularly to the field of data processing, and more particularly to a method and an apparatus for processing laser point cloud data.

BACKGROUND

Laser radars are widely used in systems such as an autopilot control system. Laser point cloud data in a laser point cloud acquired by the laser radar can be used for establishing a model for environment perception. Currently, the acquisition time of a laser point needs to be represented by using a timestamp with a relatively high precision, for example, a timestamp with 64-bit precision, to meet the data synchronization requirement, for example, the requirement of synchronizing data when different data receivers cooperate to create a three-dimensional model of a vehicle traveling environment by using the laser point cloud data. Currently, a commonly employed solution is to save, in laser point data of each laser point in a laser point cloud, a timestamp with 64-bit precision for representing an acquisition time of the each laser point.

However, there are massive laser point cloud data. On one hand, it takes a relatively long time for the CPU or GPU to process 64-bit precision timestamps of the laser point data, which cannot meet an extremely high real-time requirement of operations in the autopilot control system, affecting the stability and safety of the autopilot control system. On the other hand, when the laser point cloud data needs to be saved to perform offline debugging and in other similar cases, it consumes much storage resources to store the laser point cloud data with 64-bit precision timestamps.

SUMMARY

The present application provides a method and an apparatus for processing laser point cloud data, to solve the technical problem mentioned in the foregoing Background secontion.

In the first aspect, the present application provides a method for processing laser point cloud data, wherein the method comprises: obtaining, by a data processing party, laser point cloud data to be used by a data receiver, the laser point cloud data comprising: laser point data of a laser point in a laser point cloud, and the laser point data comprising: an acquisition time of the laser point; determining a synchronization precision timestamp for representing the acquisition time, and splitting the synchronization precision timestamp into a base timestamp and an offset timestamp, a binary number corresponding to the synchronization precision timestamp having more bits than bits of a binary number corresponding to the base timestamp and a binary number corresponding to the offset timestamp, and a sum of the base timestamp and the offset timestamp being the synchronization precision timestamp; and storing the base timestamp and compressed laser point cloud data in a storage area corresponding to the data receiver, the compressed laser point cloud data comprising: compressed laser point data that comprises the offset timestamp, so that the data receiver processes the compressed laser point cloud data based on the base timestamp and the offset timestamp in the compressed laser point data.

In the second aspect, the present application provides a method for processing laser point cloud data, where the method comprises: obtaining, by a data receiver, a base timestamp and compressed laser point cloud data, the compressed laser point cloud data comprising: compressed laser point data of a laser point in a laser point cloud, the compressed laser point data comprising: an offset timestamp, a sum of the base timestamp and the offset timestamp being a synchronization precision timestamp representing an acquisition time of the laser point, and a binary number corresponding to the synchronization precision timestamp having more bits than bits of a binary number corresponding to the base timestamp and a binary number corresponding to the offset timestamp; and processing the compressed laser point cloud data based on the base timestamp and the offset timestamp.

In the third aspect, the present application provides an apparatus for processing laser point cloud data, where the apparatus comprises: an obtaining unit, configured to obtain laser point cloud data to be used by a data receiver, the laser point cloud data comprising: laser point data of a laser point in a laser point cloud, the laser point data comprising: an acquisition time of the laser point; a processing unit, configured to determine a synchronization precision timestamp for representing the acquisition time, and split the synchronization precision timestamp into a base timestamp and an offset timestamp, a binary number corresponding to the synchronization precision timestamp having more bits than bits of a binary number corresponding to the base timestamp and a binary number corresponding to the offset timestamp, and a sum of the base timestamp and the offset timestamp being the synchronization precision timestamp; and a storage unit, configured to store the base timestamp and compressed laser point cloud data in a storage area corresponding to the data receiver, the compressed laser point cloud data comprising: compressed laser point data that comprises the offset timestamp, so that the data receiver processes the compressed laser point cloud data based on the base timestamp and the offset timestamp in the compressed laser point data.

In the fourth aspect, the present application provides an apparatus for processing laser point cloud data, where the apparatus comprises: a data obtaining unit, configured to obtain a base timestamp and compressed laser point cloud data, the compressed laser point cloud data comprising: compressed laser point data of a laser point in a laser point cloud, the compressed laser point data comprising: an offset timestamp, a sum of the base timestamp and the offset timestamp is a synchronization precision timestamp representing an acquisition time of the laser point, and a binary number corresponding to the synchronization precision timestamp having more bits than bits of a binary number corresponding to the base timestamp and a binary number corresponding to the offset timestamp; and a data processing unit, configured to process the compressed laser point cloud data based on the base timestamp and the offset timestamp.

In the method and apparatus for processing laser point cloud data provided by the present application, a data processing party obtains laser point cloud data to be used by a data receiver, the laser point cloud data comprising: laser point data of each laser point in a laser point cloud, and the laser point data comprising: an acquisition time of the laser point; determines a synchronization precision timestamp for representing the acquisition time, and splits the synchronization precision timestamp into a base timestamp and an offset timestamp; and stores the base timestamp and compressed laser point cloud data in a storage area corresponding to the data receiver, the compressed laser point cloud data comprising: compressed laser point data that comprises the offset timestamp. Laser point cloud data output by a laser radar is compressed, and the compressed laser point cloud data comprises only offset timestamps corresponding to respective laser points. Meanwhile, the base timestamp and the offset timestamp may be added to obtain the synchronization precision timestamp meeting the precision required by data synchronization, and then data is synchronized. On one hand, the processing speed of a CPU or GPU for the laser point cloud data is improved while the timestamp precision reaches the precision required by synchronization of the laser point cloud data, and on the other hand, storage space is saved.

BRIEF DESCRIPTION OF THE DRAWINGS

Other features, objectives and advantages of the present application will become more apparent upon reading the detailed description to non-limiting embodiments with reference to the accompanying drawings, wherein.

DETAILED DESCRIPTION OF EMBODIMENTS

The present application will be further described below in detail in combination with the accompanying drawings and the embodiments. It should be appreciated that the specific embodiments described herein are merely used for explaining the relevant invention, rather than limiting the invention. In addition, it should be noted that, for the ease of description, only the parts related to the relevant invention are shown in the accompanying drawings.

It should also be noted that the embodiments in the present application and the features in the embodiments may be combined with each other on a non-conflict basis. The present application will be described below in detail with reference to the accompanying drawings and in combination with the embodiments.

Figure 1:
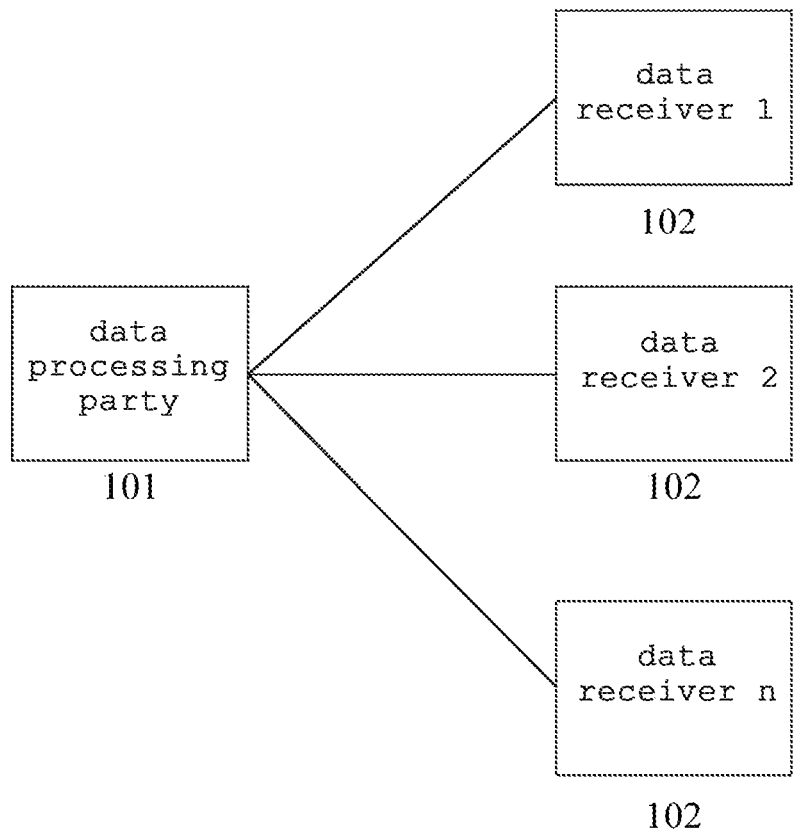
FIG. 1 is an architecture diagram of an exemplary system in which a method or an apparatus for processing laser point cloud data according to the present application may be implemented.

FIG. 1 is an exemplary system architecture 100 in which a method or an apparatus for processing laser point cloud data according to embodiments of the present application.

As shown in FIG. 1, the system architecture 100 may comprise: a data processing party 101, and multiple data receivers 102.

The data processing party 101 and the data receiver 102 may be a data processing process and a data receiving process, respectively, in an autopilot control system running on a driverless vehicle. The driverless vehicle may be configured with a laser radar, sensors (such as a speed sensor, an angle sensor and a crash sensor) deployed inside or outside the vehicle, and a bus (for example, a Controller Area Network (CAN) bus) for transmitting data of the sensors. The data processing party 101 may process laser point cloud data of a laser point cloud outputted by the laser radar. The data receiver 102 may use the processed laser point cloud data.

Figure 2:
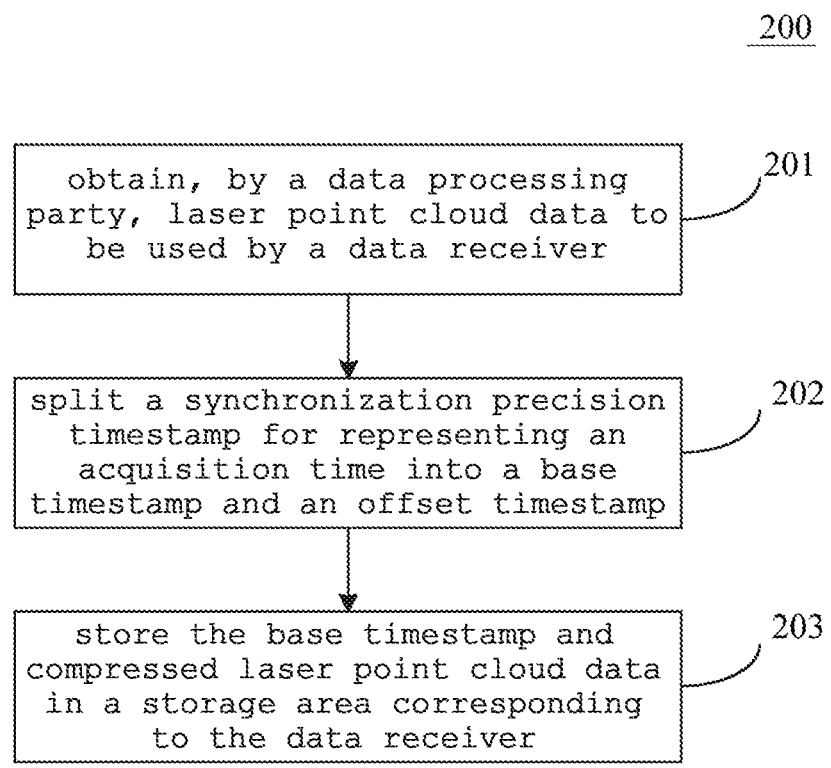
FIG. 2 is a flowchart of a method for processing laser point cloud data according to an embodiment of the present application.

Referring to FIG. 2, a procedure 200 of an embodiment of a method for processing laser point cloud data according to the present application is shown. It should be noted that, the method for processing laser point cloud data according to the embodiment of the present application may be executed by the data processing party 101 in FIG. 1. The method comprises the following steps:

Step 201: obtain, by a data processing party, laser point cloud data to be used by a data receiver.

In this embodiment, the data processing party may first obtain the laser point cloud data to be used by the data receiver. For example, the laser point cloud data to be used by the data receiver may be a part of the laser point cloud data outputted by the laser radar configured on the driverless vehicle, and this part of the laser point cloud data is used for establishing a three-dimensional model of the vehicle traveling environment. All laser points acquired by the laser radar via laser scanning in one rotation are combined to form one frame of laser point cloud. Meanwhile, one frame of laser point cloud outputted by the laser radar may correspond to laser point cloud data. One frame of laser point cloud comprises multiple laser points. Correspondingly, laser point cloud data of one frame of laser point cloud outputted by the laser radar comprises laser point data of each laser point in this frame of laser point cloud. The laser point data of each laser point comprises coordinates of the laser point, an acquisition time of the laser point, and light intensity of the laser point. Each laser point may correspond to a different acquisition time.

Step 202: split a synchronization precision timestamp for representing an acquisition time into a base timestamp and an offset timestamp.

In this embodiment, the synchronization precision timestamp for representing the acquisition time of each laser point may be determined first, and a binary number corresponding to the synchronization precision timestamp has more bits than bits of a binary number corresponding to the base timestamp and a binary number corresponding to the offset timestamp. According to a preset base timestamp with a preset precision, the synchronization precision timestamp corresponding to each laser point may be split into a base timestamp and an offset timestamp.

In this embodiment, the synchronization precision timestamp, which is in the laser point cloud data outputted by the laser radar, for representing the acquisition time of the laser point may be split into a referece timestamp with a preset precision for representing a base time and an offset timestamp with a preset precision for representing an offset time, namely, a difference between the acquisition time of the laser point and the base time. A sum of the base timestamp with the preset precision and the offset timestamp with the preset precision is the synchronization precision timestamp for representing the acquisition time of the laser point. The synchronization precision timestamp, the base timestamp, and the offset timestamp may be timestamps in different formats. The precision of a timestamp may refer to the number of bits of a binary number corresponding to the timestamp. For example, when the base timestamp and the offset timestamp are of a float type (a single-precision floating-point number type), a binary number corresponding to the float type has 32 bits, and thus the preset precision is 32 bits.

In some optional implementations of this embodiment, a binary number corresponding to the synchronization precision timestamp has 64 bits, and a binary number corresponding to the base timestamp or the offset timestamp has 32 bits.

Using one frame of laser point cloud as an example, a synchronization precision timestamp for representing an acquisition time of each laser point in the one frame of laser point cloud may be determined first. The synchronization precision timestamp may be of a double type (a double-precision floating-point number type). A binary number corresponding to the double type has 64 bits which can be the precision needed for the synchronization requirement when different data receivers use the laser point cloud data. Then, according to a preset 32-bit precision base timestamp for representing a base time, the synchronization precision timestamp corresponding to each laser point is split into a 32-bit precision base timestamp and a 32-bit precision offset timestamp for representing an offset time, namely, a difference between the acquisition time of the laser point and the base time. Therefore, a 32-bit precision base timestamp and a 32-bit precision offset timestamp are used for representing the acquisition time of the laser point.

In this embodiment, a system base time, for example, the base time of the UNIX system: Jan. 1, 1970, or the base time of the GPS system: Jan. 6, 1980, is used as a base time, and correspondingly, the base time may be represented by using a base timestamp. When the data receiver needs to use laser point cloud data in a period of time, a start moment of the period of time may be used as a base time, and correspondingly, the base time may be represented by using a base timestamp.

In some optional implementations of this embodiment, before the determining the synchronization precision timestamp for representing the acquisition time, the method further comprises: using a timestamp of a reference time which is required by the data receiver for pre-processing the laser point cloud data, as the base timestamp.

In some optional implementations of this embodiment, the pre-processing is motion compensation, the laser point cloud data is laser point cloud data in one frame of laser point cloud, and the base timestamp is a timestamp that represents an acquisition time of the first laser point in the one frame of laser point cloud.

In this embodiment, a base time may be set according to a reference time needed for pre-processing when the data receiver processes the laser point cloud data, and correspondingly, a base timestamp for representing the base time is set.

For example, the precision of the synchronization precision timestamp corresponding to each laser point in one frame of laser point cloud is 64 bits, and the precision of the base timestamp and the offset timestamp is 32 bits. The laser point cloud data to be used by the data receiver is the laser point cloud data on which motion compensation needs to be performed to establish a vehicle traveling environment model. According to the requirement that the motion compensation needs to be performed on the laser point cloud data in each frame of laser point cloud to be used by the data receiver, the reference time required when the data receiver performs the motion compensation on the laser point cloud data in this frame of laser point cloud is determined as the acquisition time of the first laser point in this frame of laser point cloud. Before determining the synchronization precision timestamp for representing the acquisition time of the laser point, the data receiver may preset a 32-bit precision timestamp, which is used for representing the acquisition time of the first laser point in the laser point cloud data of the frame of laser point cloud, as the base timestamp. According to the base timestamp with 32-bit precision, the 64-bit precision synchronization precision timestamp for representing the acquisition time of each laser point in the frame of laser point cloud may be separately split into a 32-bit precision base timestamp and a 32-bit precision offset timestamp. When performing the motion compensation on the laser point cloud data of the laser point cloud to be used, the data receiver only needs to convert coordinates of each laser point into coordinates in a radar coordinate system corresponding to the first laser point according to the 32-bit precision offset timestamp of each laser point and according to a coordinate conversion relationship between the offset timestamp and the base timestamp, and perform the motion compensation on the coordinates of each laser point. When the laser point cloud data is stored, only the 32-bit precision base timestamp and the 32-bit precision offset timestamp corresponding to each laser point need to be stored, which further improves the processing speed for the compressed laser point cloud data while saving storage space occupied by the laser point cloud data.

Figure 3:
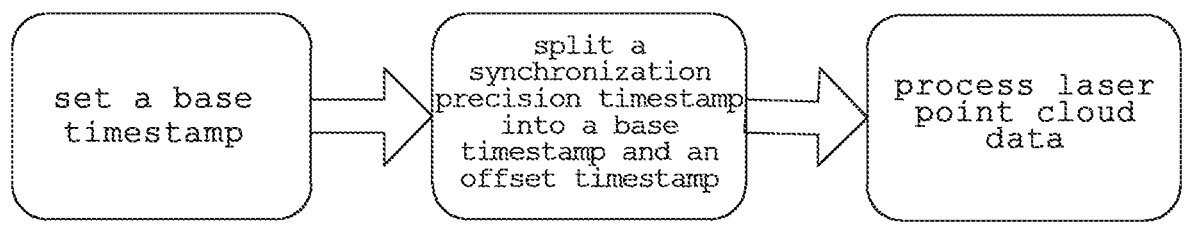
FIG. 3 is an exemplary flowchart of processing a synchronization precision timestamp by a data processing party.

Referring to FIG. 3, which shows an exemplary flow chart of processing a synchronization precision timestamp by a data processing party.

A base timestamp is set. A base timestamp for representing a base time may be set according to a requirement of a data receiver when processing laser point cloud data. A smaller difference between an acquisition time of a laser point and the base time represents a smaller storage space occupied by an offset timestamp that represents the difference between the acquisition time of the laser point and the base time. A base time of a system, for example, the base time of the UNIX system: Jan. 1, 1970, or the base time of the GPS system: Jan. 6, 1980, is used as a base time. Correspondingly, the base time may be represented by using a base timestamp. A reference time required when the data receiver processes compressed laser point cloud data may be used as the base timestamp. For example, when the data receiver needs to use laser point cloud data in a period of time, a start moment of the period of time may be used as the base time. Correspondingly, the base time may be represented by using the base timestamp.

The synchronization precision timestamp is split into the base timestamp and the offset timestamp. A difference between the synchronization precision timestamp for representing the acquisition time of the laser point and the base timestamp may be calculated, to obtain the offset timestamp. The synchronization precision timestamp may be of the double type, and the precision thereof may be 64 bits. The 64-bit precision synchronization precision timestamp may be split into a 32-bit precision base timestamp and a 32-bit precision offset timestamp.

Laser point cloud data is processed. When processing the laser point cloud data, for example, when performing motion compensation processing on a frame of laser point cloud data, the data receiver only needs to use the offset timestamp to perform the motion compensation on the laser point cloud data corresponding to coordinates of each laser point.

Step 203: the base timestamp and compressed laser point cloud data are stored in a storage area corresponding to the data receiver.

In this embodiment, after the synchronization precision timestamp for representing the acquisition time is split into the base timestamp and the offset timestamp in step 202, the base timestamp and the compressed laser point cloud data corresponding to the laser point cloud data obtained in step 201 may be stored in the storage area corresponding to the data receiver. The compressed laser point cloud data corresponding to the laser point cloud comprises compressed laser point data of each laser point. The compressed laser point data of each laser point comprises: the offset timestamp for representing the offset time, namely, the difference between the acquisition time of the laser point and the base time, coordinates of the laser point, and light intensity of the laser point.

For example, the precision of a synchronization precision timestamp corresponding to each laser point in one frame of laser point cloud to be used by the data receiver is 64 bits, and the precision of a base timestamp and an offset timestamp is 32 bits; laser point cloud data in this frame of laser point cloud is used for establishing a three-dimensional model of a vehicle traveling environment. Therefore, the data processing party needs to perform motion compensation on the laser point cloud data in this frame of laser point cloud. When the data processing party performs the motion compensation on the laser point cloud data in this frame of laser point cloud, a reference time required when the motion compensation is performed on the laser point cloud data in this frame of laser point cloud is an acquisition time of the first laser point in this frame of laser point cloud. A 32-bit timestamp for representing the acquisition time of the first laser point in the one frame of laser point cloud may be preset as the base timestamp. According to the 32-bit precision base timestamp, the 64-bit precision synchronization precision timestamp for representing the acquisition time of the laser point in the one frame of laser point cloud may be split into the 32-bit precision base timestamp and a 32-bit precision offset timestamp. Therefore, only the 32-bit precision base timestamp and compressed laser point cloud data of the one frame of laser point cloud formed by compressed laser point data of each laser point need to be stored in the storage area corresponding to the data receiver. The compressed laser point data of each laser point comprises: a 32-bit precision offset timestamp for representing a difference between the acquisition time of the laser point and the base time, coordinates of the laser point, and light intensity of the laser point. When different data receivers need to synchronize data, for example, when different data receivers need to synchronize data when cooperating to create a three-dimensional model of a vehicle traveling environment by using the laser point cloud data, for the laser point cloud data to be used by each receiver, the 32-bit base timestamp and the 32-bit offset timestamp in the compressed laser point data of each laser point may be separately added to obtain the 64-bit precision synchronization precision timestamp corresponding to each laser point. Therefore, different data receivers may synchronize data with each other by using the 64-bit precision timestamp. On one hand, the processing speed of the CPU or GPU for the laser point cloud data is improved while the 64-bit timestamp precision required by synchronization of the laser point cloud data is used, and on the other hand, storage space is saved.

When the laser point cloud data to be used by the data receiver is laser point cloud data on which motion compensation needs to be performed to establish a vehicle traveling environment model, according to the requirement that the motion compensation needs to be performed on the laser point cloud data of each frame of laser point cloud to be used by the data receiver, the 32-bit precision timestamp for representing the acquisition time of the first laser point in the laser point cloud data in one frame of laser point cloud may be preset as the base timestamp. According to the 32-bit precision base timestamp, the 64-bit precision synchronization precision timestamp for representing the acquisition time of each laser point in one frame of laser point cloud may be separately split into the 32-bit precision base timestamp and the 32-bit precision offset timestamp. When the data receiver performs the motion compensation on the laser point cloud data in the to-be-used laser point cloud to create a three-dimensional model of a vehicle traveling environment by using the to-be-used laser point cloud data, the data receiver only needs to convert coordinates of each laser point into coordinates in a radar coordinate system corresponding to the first laser point according to the 32-bit precision offset timestamp corresponding to each laser point and according to a coordinate conversion relationship between the offset timestamp and the base timestamp, and perform the motion compensation on the coordinates of each laser point. When laser point cloud data is stored, only a 32-bit precision base timestamp and a 32-bit precision offset timestamp corresponding to each laser point need to be stored, which further improves the speed for processing the compressed laser point cloud data while saving storage space occupied by the laser point cloud data.

Figure 4:
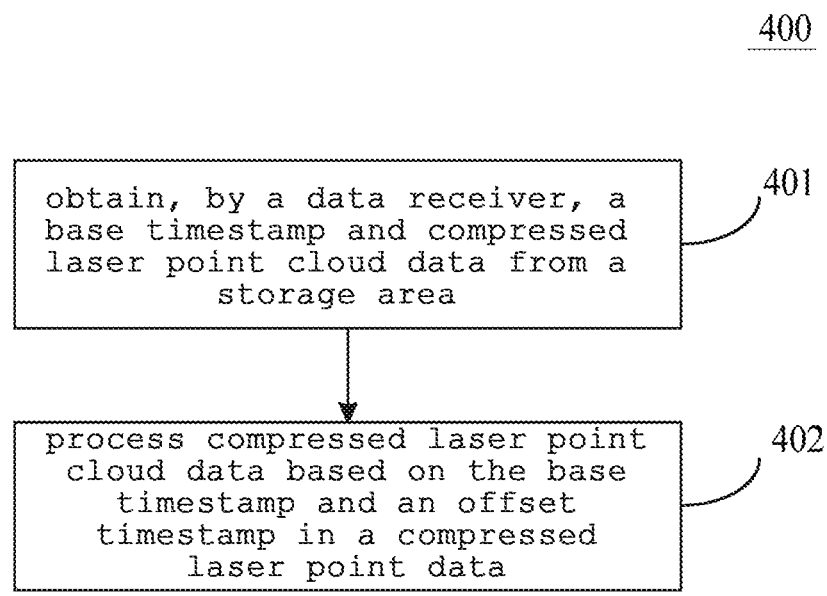
FIG. 4 is a flowchart of a method for processing laser point cloud data according to another embodiment of the present application.

Referring to FIG. 4, which shows a flow chart of a method for processing laser point cloud data according to another embodiment of the present application. It should be noted that, the method for processing laser point cloud data provided by the present embodiment may be executed by the data receiver 102 in FIG. 1. The method comprises the following steps:

Step 401: obtain, by a data receiver, a base timestamp and compressed laser point cloud data from a storage area.

In this embodiment, the data receiver may acquire, from the corresponding storage area, the base timestamp for representing a base time and the compressed laser point cloud data. The compressed laser point cloud data comprises compressed laser point data of each laser point. The compressed laser point data of each laser point comprises: an offset timestamp for representing an offset time, namely, a difference between a acquisition time of the laser point and the base time, coordinates of the laser point, and light intensity of the laser point.

In this embodiment, a data processing party may pre-process laser point cloud data to be used by the data receiver to obtain the compressed laser point cloud data. The laser point cloud data to be used by the data receiver may be a part of laser point cloud data outputted by a laser radar configured on a driverless vehicle, and this part of laser point cloud data is laser point cloud data for establishing a three-dimensional model of a vehicle traveling environment. All laser points that are acquired by the laser radar via laser scanning in one rotation are combined to form one frame of laser point cloud. Meanwhile, one frame of laser point cloud outputted by the laser radar may correspond to laser point cloud data. One frame of laser point cloud comprises multiple laser points. Correspondingly, laser point cloud data of one frame of laser point cloud outputted by the laser radar comprises laser point data of each laser point in this frame of laser point cloud. The laser point data of each laser point comprises coordinates of the laser point, an acquisition time of the laser point, and light intensity of the laser point. Each laser point may correspond to a different acquisition time.

The data processing party may split a synchronization precision timestamp, which is in the laser point cloud data outputted by the laser radar and to be used by the data receiver, for representing an acquisition time of each laser point, to obtain a base timestamp and an offset timestamp. A binary number corresponding to the synchronization precision timestamp has more bits than bits of a binary number corresponding to the base timestamp and a binary number corresponding to the offset timestamp. A sum of the base timestamp and the offset timestamp is the synchronization precision timestamp.

By using the 64-bit precision synchronization precision timestamp for representing the acquisition time of the laser point and laser point cloud data in one frame of laser point cloud as an example, the data processing party may preset a 32-bit timestamp, which represents the acquisition time of the first laser point in one frame of laser point cloud data, as a base timestamp. A base time of a system, for example, the base time of the UNIX system: Jan. 1, 1970, or the base time of the GPS system: Jan. 6, 1980, is used as a base time, and correspondingly, the base time may be represented by using a 32-bit precision base timestamp. A reference time required when the data receiver processes the compressed laser point cloud data may be used as a base time. For example, when the data receiver needs to use laser point cloud data in a period of time, a start moment of the period of time may be used as the base time, and correspondingly, the base time may be represented by using a 32-bit precision base timestamp.

The data processing party may split, according to the 32-bit precision base timestamp, the 64-bit precision synchronization precision timestamp for representing the acquisition time of the laser point in one frame of laser point cloud into the 32-bit precision base timestamp and a 32-bit precision offset timestamp.

In the storage area corresponding to the data receiver, only a 32-bit precision base timestamp and compressed laser point cloud data of one frame of laser point cloud formed by compressed laser point data of each laser point need to be stored. The compressed laser point data of each laser point comprises: a 32-bit precision offset timestamp for representing a difference between the acquisition time of the laser point and the base time, coordinates of the laser point, and light intensity of the laser point.

When the data receiver performs motion compensation on the laser point cloud data of the to-be-used laser point cloud to establish a three-dimensional model of a vehicle traveling environment by using the to-be-used laser point cloud data, by using the laser point cloud data in one frame of laser point cloud as an example, the data receiver only needs to read, from the storage area corresponding to the data receiver, a 32-bit precision base timestamp and a 32-bit offset timestamp corresponding to each laser point in the frame of laser point cloud, convert coordinates of each laser point into coordinates in a radar coordinate system corresponding to the first laser point according to the 32-bit precision offset timestamp of each laser point and according to a coordinate conversion relationship between the offset timestamp and the base timestamp, and perform the motion compensation on the coordinates of each laser point, which further improves the speed for processing the compressed laser point cloud data while saving storage space occupied by the laser point cloud data.

Step 402: process compressed laser point cloud data based on the base timestamp and an offset timestamp in a compressed laser point data.

In this embodiment, after the data receiver obtains the base timestamp and the compressed laser point cloud data from the corresponding storage area in step 401, the compressed laser point cloud data may be processed based on the base timestamp and the offset timestamp of the compressed laser point data in the compressed laser point cloud data.

For example, the precision of the synchronization precision timestamp corresponding to the laser point in one frame of laser point cloud to be used by the data receiver is 64 bits, and the precision of the base timestamp and the offset timestamp is 32 bits. The laser point cloud data in this frame of laser point cloud is used for establishing a three-dimensional model of a vehicle traveling environment. Therefore, the data processing party needs to perform motion compensation on the laser point cloud data in this frame of laser point cloud.

When performing the motion compensation on compressed laser point cloud data of one frame of laser point cloud, the data receiver only needs to read, from the storage area corresponding to the data receiver, an offset timestamp of each laser point in the frame of laser point cloud, and perform the motion compensation on coordinates of the laser point in the compressed laser point data corresponding to each laser point according to the offset timestamp corresponding to each laser point. Therefore, the speed for processing the compressed laser point cloud data is further improved while storage space occupied by the laser point cloud data is saved.

In some optional implementations of this embodiment, the binary number corresponding to the base timestamp has 32 bits; and the processing compressed laser point cloud data based on the base timestamp and the offset timestamp comprises: adding the base timestamp and the offset timestamp, to obtain a synchronization precision timestamp, a binary number corresponding to the synchronization precision timestamp having 64 bits; and performing data synchronization with other data receivers based on the synchronization precision timestamp.

For example, the precision of the synchronization precision timestamp for representing the acquisition time of the laser point is 64 bits, and the precision of the base timestamp and the offset timestamp is 32 bits. When different data receivers need to synchronize data, for example, different data receivers need to synchronize data when cooperating to create a three-dimensional model of a vehicle traveling environment by using the laser point cloud data, each data receiver may read, from the corresponding storage area, the base timestamp and the offset timestamp corresponding to each laser point, and separately add the 32-bit precision base timestamp and the 32-bit precision offset timestamp corresponding to each laser point, to obtain a 64-bit precision synchronization precision timestamp for representing the acquisition time of each laser point. Therefore, different data receivers can synchronize data by using the 64-bit precision timestamp, and cooperate to create a three-dimensional model of a vehicle traveling environment by using the laser point cloud data.

Figure 5:
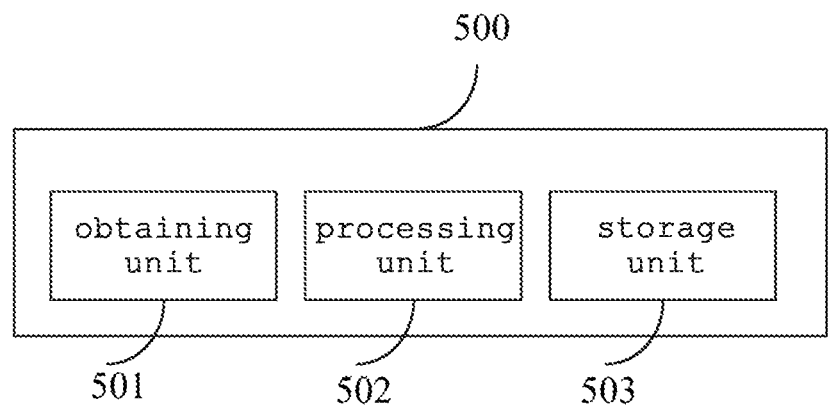
FIG. 5 is a schematic structural diagram of an apparatus for processing laser point cloud data according to an embodiment of the present application.

Referring to FIG. 5, which is a schematic structural diagram of an apparatus for processing laser point cloud data according to an embodiment of the present application. The apparatus of this embodiment corresponds to the method embodiment shown in FIG. 2.

As shown in FIG. 5, the apparatus 500 for processing laser point cloud data of this embodiment comprises: an obtaining unit 501, a processing unit 502, and a storage unit 503. The obtaining unit 501 is configured to obtain laser point cloud data to be used by a data receiver, the laser point cloud data comprising: laser point data of each laser point in a laser point cloud, and the laser point data comprising: an acquisition time of the laser point; the processing unit 502 is configured to determine a synchronization precision timestamp for representing the acquisition time, and split the synchronization precision timestamp into a base timestamp and an offset timestamp, where a binary number corresponding to the synchronization precision timestamp has more bits than bits of a binary number corresponding to the base timestamp and a binary number corresponding to the offset timestamp, and a sum of the base timestamp and the offset timestamp is the synchronization precision timestamp; and the storage unit 503 is configured to store the base timestamp and compressed laser point cloud data in a storage area corresponding to the data receiver, the compressed laser point cloud data comprising: compressed laser point data that comprises the offset timestamp, so that the data receiver processes the compressed laser point cloud data based on the base timestamp and the offset timestamp in the compressed laser point data.

In some optional implementations of this embodiment, the binary number corresponding to the synchronization precision timestamp has 64 bits, and each of the binary number corresponding to the base timestamp and the binary number corresponding to the offset timestamp has 32 bits.

In some optional implementations of this embodiment, the apparatus 500 further comprises: a selection unit (not shown), configured to: before the synchronization precision timestamp for representing the acquisition time is determined, use a timestamp of a reference time, which is required by the data receiver for preprocessing the laser point cloud data, as the base timestamp.

In some optional implementations of this embodiment, the preprocessing is motion compensation, the laser point cloud data is laser point cloud data of one frame of laser point cloud, and the base timestamp is a timestamp that represents an acquisition time of the first laser point in one frame of laser point cloud.

Figure 6:
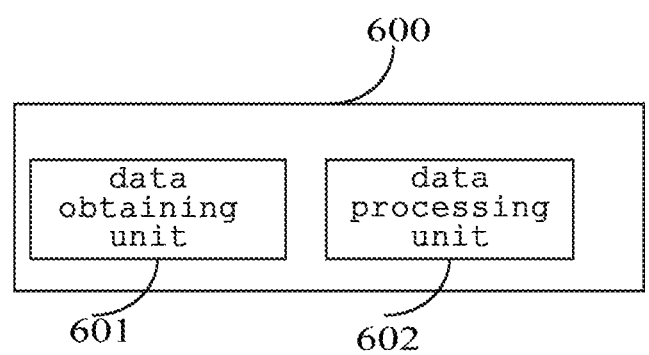
FIG. 6 is a schematic structural diagram of an apparatus for processing laser point cloud data according to another embodiment of the present application.

Please refer to FIG. 6, which is a schematic structural diagram of an embodiment of an apparatus for processing laser point cloud data according to the present application. The apparatus embodiment corresponds to the method embodiment shown in FIG. 4.

As shown in FIG. 6, the apparatus 600 for processing laser point cloud data comprises: a data obtaining unit 601 and a data processing unit 602. The data obtaining unit 601 is configured to obtain a base timestamp and compressed laser point cloud data, the compressed laser point cloud data comprising: compressed laser point data of each laser point in a laser point cloud, and the compressed laser point data comprising: an offset timestamp, where a sum of the base timestamp and the offset timestamp is a synchronization precision timestamp representing an acquisition time of the laser point, and a binary number corresponding to the synchronization precision timestamp has more bits than bits of a binary number corresponding to the base timestamp and a binary number corresponding to the offset timestamp; and the data processing unit 602 is configured to process the compressed laser point cloud data based on the base timestamp and the offset timestamp.

In some optional implementations of this embodiment, the data processing unit 602 comprises: a synchronization subunit (not shown), configured to: when the binary number corresponding to the base timestamp has 32 bits, add the base timestamp and the offset timestamp, to obtain the synchronization precision timestamp, the binary number corresponding to the synchronization precision timestamp having 64 bits.

Figure 7:
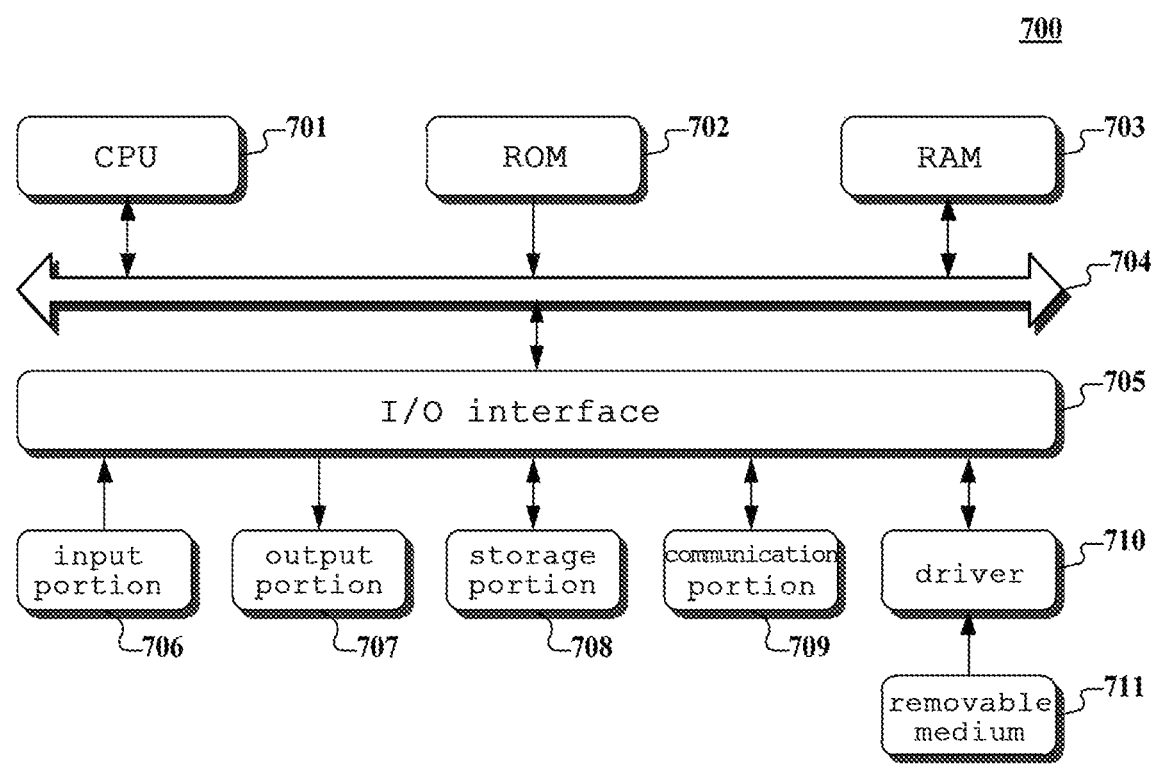
FIG. 7 is a schematic structural diagram of a computer system adapted to implement an apparatus for processing laser point cloud data according to the embodiments of the present application.

Referring to FIG. 7, a schematic structural diagram of a computer system adapted to implement apparatus for processing laser point cloud data of the embodiments of the present application is shown.

As shown in FIG. 7, the computer system 700 includes a central processing unit (CPU) 701, which may execute various appropriate actions and processes in accordance with a program stored in a read-only memory (ROM) 702 or a program loaded into a random access memory (RAM) 703 from a storage portion 708. The RAM 703 also stores various programs and data required by operations of the system 700. The CPU 701, the ROM 702 and the RAM 703 are connected to each other through a bus 704. An input/output (I/O) interface 705 is also connected to the bus 704.

The following components are connected to the I/O interface 705: an input portion 706 including a keyboard, a mouse etc.; an output portion 707 comprising a cathode-ray tube (CRT), a liquid crystal display (LCD) and a speaker etc.; a storage portion 708 including a hard disk and the like; and a communication portion 709 comprising a network interface card, such as a LAN card and a modem. The communication portion 709 performs communication processes via a network, such as the Internet. A driver 710 is also connected to the I/O interface 705 as required. A removable medium 711, such as a magnetic disk, an optical disk, a magneto-optical disk, and a semiconductor memory, may be installed on the driver 710, to facilitate the retrieval of a computer program from the removable medium 711, and the installation thereof on the storage portion 708 as needed.

In particular, according to an embodiment of the present disclosure, the process described above with reference to the flow charts may be implemented in a computer software program. For example, an embodiment of the present disclosure includes a computer program product, which comprises a computer program that is tangibly embedded in a machine-readable medium. The computer program comprises program codes for executing the method of the flow charts. In such an embodiment, the computer program may be downloaded and installed from a network via the communication portion 709, and/or may be installed from the removable media 711.

The flow charts and block diagrams in the figures illustrate architectures, functions and operations that may be implemented according to the system, the method and the computer program product of the various embodiments of the present invention. In this regard, each block in the flow charts and block diagrams may represent a module, a program segment, or a code portion. The module, the program segment, or the code portion comprises one or more executable instructions for implementing the specified logical function. It should be noted that, in some alternative implementations, the functions denoted by the blocks may occur in a sequence different from the sequences shown in the figures. For example, in practice, two blocks in succession may be executed, depending on the involved functionalities, substantially in parallel, or in a reverse sequence. It should also be noted that, each block in the block diagrams and/or the flow charts and/or a combination of the blocks may be implemented by a dedicated hardware-based system executing specific functions or operations, or by a combination of a dedicated hardware and computer instructions.

In another aspect, the present application further provides a computer readable storage medium. The computer readable storage medium may be the computer readable storage medium included in the apparatus in the above embodiments, or a stand-alone computer readable storage medium which has not been assembled into the apparatus. The computer readable storage medium stores one or more programs. The programs caused a device to perform the following method when being executed by the device: obtaining, by a data processing party, laser point cloud data to be used by a data receiver, the laser point cloud data comprising: laser point data of a laser point in a laser point cloud, the laser point data comprising: an acquisition time of the laser point; determining a synchronization precision timestamp for representing the acquisition time, and splitting the synchronization precision timestamp into a base timestamp and an offset timestamp, a binary number corresponding to the synchronization precision timestamp having more bits than bits of a binary number corresponding to the base timestamp and a binary number corresponding to the offset timestamp, and a sum of the base timestamp and the offset timestamp being the synchronization precision timestamp; and storing the base timestamp and compressed laser point cloud data in a storage area corresponding to the data receiver, the compressed laser point cloud data comprising: compressed laser point data that comprises the offset timestamp, so that the data receiver processes the compressed laser point cloud data based on the base timestamp and the offset timestamp in the compressed laser point data.

The foregoing is only a description of the preferred embodiments of the present application and the applied technical principles. It should be appreciated by those skilled in the art that the inventive scope of the present application is not limited to the technical solutions formed by the particular combinations of the above technical features. The inventive scope should also cover other technical solutions formed by any combinations of the above technical features or equivalent features thereof without departing from the concept of the invention, such as, technical solutions formed by replacing the features as disclosed in the present application with (but not limited to), technical features with similar functions.

What is claimed is:

1. A method for processing laser point cloud data, comprising:
   obtaining, by a data processing party, laser point cloud data to be used by a data receiver, the laser point cloud data comprising: laser point data of a laser point in a laser point cloud, the laser point data comprising: an acquisition time of the laser point;
   determining a synchronization precision timestamp for representing the acquisition time, and splitting the synchronization precision timestamp into a base timestamp and an offset timestamp, a binary number corresponding to the synchronization precision timestamp having more bits than bits of a binary number corresponding to the base timestamp and a binary number corresponding to the offset timestamp, and a sum of the base timestamp and the offset timestamp being the synchronization precision timestamp; and
   storing the base timestamp and compressed laser point cloud data in a storage area corresponding to the data receiver, the compressed laser point cloud data comprising: compressed laser point data that comprises the offset timestamp, so that the data receiver processes the compressed laser point cloud data based on the base timestamp and the offset timestamp in the compressed laser point data.

2. The method according to claim 1, wherein the binary number corresponding to the synchronization precision timestamp has 64 bits, and each of the binary number corresponding to the base timestamp and the binary number corresponding to the offset timestamp has 32 bits.

3. The method according to claim 2, wherein before the determining the synchronization precision timestamp for representing the acquisition time, the method further comprises:
   using a timestamp of a reference time required by the data receiver for pre-processing the laser point cloud data, as the base timestamp.

4. The method according to claim 3, wherein the pre-processing is motion compensation, the laser point cloud data is laser point cloud data of a laser point cloud frame, and the base timestamp is a timestamp representing an acquisition time of a first laser point in the laser point cloud frame.

5. A method for processing laser point cloud data, comprising:
   obtaining, by a data receiver, a base timestamp and compressed laser point cloud data, the compressed laser point cloud data comprising: compressed laser point data of a laser point in a laser point cloud, the compressed laser point data comprising: an offset timestamp, a sum of the base timestamp and the offset timestamp being a synchronization precision timestamp representing an acquisition time of the laser point, and a binary number corresponding to the synchronization precision timestamp having more bits than bits of a binary number corresponding to the base timestamp and a binary number corresponding to the offset timestamp; and
   processing the compressed laser point cloud data based on the base timestamp and the offset timestamp.

6. The method according to claim 5, wherein the binary number corresponding to the base timestamp has 32 bits; and
   the processing the compressed laser point cloud data based on the base timestamp and the offset timestamp comprises:
   adding the base timestamp and the offset timestamp to obtain the synchronization precision timestamp, the binary number corresponding to the synchronization precision timestamp having 64 bits; and
   performing data synchronization with other data receivers based on the synchronization precision timestamp.

7. An apparatus for processing laser point cloud data, comprising:
   at least one processor; and
   a memory storing instructions, which when executed by the at least one processor, cause the at least one processor to perform operations, the operations comprising:
   obtaining laser point cloud data to be used by a data receiver, the laser point cloud data comprising: laser point data of a laser point in a laser point cloud, the laser point data comprising: an acquisition time of the laser point;

determining a synchronization precision timestamp for representing the acquisition time, and splitting the synchronization precision timestamp into a base timestamp and an offset timestamp, a binary number corresponding to the synchronization precision timestamp having more bits than bits of a binary number corresponding to the base timestamp and a binary number corresponding to the offset timestamp, and a sum of the base timestamp and the offset timestamp being the synchronization precision timestamp; and storing the base timestamp and compressed laser point cloud data in a storage area corresponding to the data receiver, the compressed laser point cloud data comprising:

compressed laser point data that comprises the offset timestamp, so that the data receiver processes the compressed laser point cloud data based on the base timestamp and the offset timestamp in the compressed laser point data.

8. The apparatus according to claim 7, wherein the binary number corresponding to the synchronization precision timestamp has 64 bits, and each of the binary number corresponding to the base timestamp and the binary number corresponding to the offset timestamp has 32 bits.

9. The apparatus according to claim 8, wherein the operations further comprises:

before the determining the synchronization precision timestamp for representing the acquisition time, using a timestamp of a reference time required by the data receiver for pre-processing the laser point cloud data, as the base timestamp.

10. The apparatus according to claim 9, wherein the pre-processing is motion compensation, the laser point cloud data is laser point cloud data of a laser point cloud frame, and the base timestamp is a timestamp representing an acquisition time of a first laser point in the laser point cloud frame.

11. An apparatus for processing laser point cloud data, comprising:

at least one processor; and a memory storing instructions, which when executed by the at least one processor, cause the at least one processor to perform operations, the operations comprising:

obtaining a base timestamp and compressed laser point cloud data, the compressed laser point cloud data comprising: compressed laser point data of a laser point in a laser point cloud, and the compressed laser point data comprising: an offset timestamp, a sum of the base timestamp and the offset timestamp being a synchronization precision timestamp representing an acquisition time of the laser point, and a binary number corresponding to the synchronization precision timestamp having more bits than bits of a binary number corresponding to the base timestamp and a binary number corresponding to the offset timestamp; and processing the compressed laser point cloud data based on the base timestamp and the offset timestamp.

12. The apparatus according to claim 11, wherein the processing the compressed laser point cloud data based on the base timestamp and the offset timestamp comprises:

adding the base timestamp and the offset timestamp to obtain the synchronization precision timestamp, the binary number corresponding to the synchronization precision timestamp having 64 bits; and performing data synchronization with other data receivers based on the synchronization precision timestamp.

* * * * *